(12) United States Patent
Lee

(10) Patent No.: US 11,917,280 B2
(45) Date of Patent: *Feb. 27, 2024

(54) CAMERA MODULE COMPRISING A BASE COMPRISING A RIB BETWEEN A LOWER SPRING AND A SHIELD CAN

(71) Applicant: LG INNOTEK CO., LTD., Seoul (KR)

(72) Inventor: Jungsik Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,296

(22) Filed: Mar. 31, 2023

(65) Prior Publication Data

US 2023/0239562 A1 Jul. 27, 2023

Related U.S. Application Data

(63) Continuation of application No. 17/645,679, filed on Dec. 22, 2021, now Pat. No. 11,647,271, which is a
(Continued)

(30) Foreign Application Priority Data

Dec. 9, 2010 (KR) .................. 10-2010-0125731
Dec. 13, 2010 (KR) .................. 10-2010-0127053

(51) Int. Cl.
*H04N 23/57* (2023.01)
*G03B 3/10* (2021.01)
(Continued)

(52) U.S. Cl.
CPC .............. *H04N 23/57* (2023.01); *G03B 3/10* (2013.01); *G03B 13/36* (2013.01); *H04N 23/54* (2023.01); *H04N 23/55* (2023.01)

(58) Field of Classification Search
CPC .......... H04N 5/23261; H04N 5/23287; H04N 5/2254; G01J 1/0266; F21V 14/02;
(Continued)

(56) References Cited

U.S. PATENT DOCUMENTS 7,874,746 B2   1/2011  Lee
9,300,849 B2 * 3/2016  Lee ........................ H04N 23/57
(Continued)

FOREIGN PATENT DOCUMENTS

CN   1971401 A   5/2007
CN   2909597 Y   6/2007
(Continued)

OTHER PUBLICATIONS

International Search Report in International Application No. PCT/KR2011/008648, filed Nov. 14, 2011.
(Continued)

*Primary Examiner* — Christopher K Peterson
(74) *Attorney, Agent, or Firm* — Saliwanchik, Lloyd & Eisenschenk

(57) ABSTRACT

The present invention relates to a camera module, the module including: a PCB; an image sensor mounted on the PCB and formed with an image pickup device; a base mounted on the PCB and including a plated portion formed at a lower center with an opening mounted with an IR filter; a lower spring plate formed with a conductive material; a spacer arranged on an upper surface of the lower spring plate and forming a staircase structure by a rib wrapping a periphery of the lower spring plate to supportively apply a pressure to the lower spring plate; a lens actuator including a bobbin, and a yoke; an upper spring plate coupled to an upper surface of the lens actuator; and a cover attached to an upper surface of the upper spring plate.

20 Claims, 3 Drawing Sheets

Related U.S. Application Data continuation of application No. 16/997,555, filed on Aug. 19, 2020, now Pat. No. 11,245,828, which is a continuation of application No. 16/263,850, filed on Jan. 31, 2019, now Pat. No. 10,785,396, which is a continuation of application No. 15/962,741, filed on Apr. 25, 2018, now Pat. No. 10,237,462, which is a continuation of application No. 15/053,340, filed on Feb. 25, 2016, now Pat. No. 9,986,143, which is a continuation of application No. 13/990,674, filed as application No. PCT/KR2011/008648 on Nov. 14, 2011, now Pat. No. 9,300,849.

(51) Int. Cl.
*G03B 13/36* (2021.01)
*H04N 23/54* (2023.01)
*H04N 23/55* (2023.01)

(58) Field of Classification Search
CPC .. G03B 17/02; G03B 5/00; G03B 2205/0092; G03B 2205/0023; G03B 2205/0069
USPC .............. 250/208.1, 239; 257/432–434, 680; 359/811, 819, 823, 824; 396/55, 133, 396/144, 529, 535; 439/607.01–607.59; 348/294, 335, 340, 373, 374
See application file for complete search history.

(56) References Cited

U.S. PATENT DOCUMENTS

| | | | | |
|---|---|---|---|---|
| 9,986,143 | B2* | 5/2018 | Lee | H04N 23/54 |
| 10,015,397 | B2 | 7/2018 | Emmett et al. | |
| 10,182,192 | B2 | 1/2019 | Niida | |
| 10,237,462 | B2* | 3/2019 | Lee | H04N 23/55 |
| 10,785,396 | B2* | 9/2020 | Lee | H04N 23/55 |
| 11,245,828 | B2* | 2/2022 | Lee | H04N 23/55 |
| 11,647,271 | B2* | 5/2023 | Lee | H04N 23/57 348/374 |
| 2006/0125950 | A1 | 6/2006 | Chen | |
| 2007/0086769 | A1 | 4/2007 | Watanabe et al. | |
| 2008/0117536 | A1* | 5/2008 | Higuchi | G02B 7/08 359/824 |
| 2008/0259467 | A1 | 10/2008 | Chung | |
| 2009/0252489 | A1 | 10/2009 | Huang et al. | |
| 2010/0007973 | A1 | 1/2010 | Sata et al. | |
| 2010/0046935 | A1 | 2/2010 | Horidan et al. | |
| 2010/0150545 | A1 | 6/2010 | Imai et al. | |
| 2010/0157137 | A1 | 6/2010 | Imai et al. | |
| 2011/0097062 | A1 | 4/2011 | Tsuruta et al. | |
| 2011/0130177 | A1 | 6/2011 | Halliday | |
| 2013/0235220 | A1 | 9/2013 | Williams | |

FOREIGN PATENT DOCUMENTS

| | | |
|---|---|---|
| CN | 101509996 A | 8/2008 |
| CN | 201149947 Y | 11/2008 |
| CN | 101322305 A | 12/2008 |
| CN | 101577790 A | 11/2009 |
| EP | 2 077 460 A1 | 7/2009 |
| EP | 2 124 431 A2 | 11/2009 |
| KR | 10-2007-0109475 A | 11/2007 |
| KR | 10-0801642 B1 | 2/2008 |
| KR | 10-0818880 B1 | 4/2008 |
| KR | 10-2008-0048113 A | 6/2008 |
| KR | 10-2009-0060653 A | 6/2009 |
| KR | 10-2009-0117613 A | 11/2009 |
| KR | 10-2010-0022692 A | 3/2010 |
| KR | 10-2010-0062657 A | 6/2010 |
| KR | 10-2010-0124135 A | 11/2010 |
| KR | 10-2010-0126176 A | 12/2010 |

OTHER PUBLICATIONS

Partial European Search Report in European U.S. Appl. No. 11/846,302.
Office Action dated May 25, 2012 in Korean Application No. 10-2010-0125731, filed Dec. 9, 2010.
Office Action dated Feb. 7, 2012 in Korean Application No. 10-2010-0127053, filed Dec. 13, 2010.
Office Action dated Sep. 1, 2015 in Chinese Application No. 201180059640.4.
Office Action dated Oct. 17, 2014 in U.S. Appl. No. 13/990,674.
Office Action dated Sep. 9, 2019 in U.S. Appl. No. 16/263,850.
Office Action dated Feb. 25, 2020 in U.S. Appl. No. 16/263,850.
Notice of Allowance dated May 19, 2020 in U.S. Appl. No. 16/263,850.
European Search Report dated Jan. 26, 2021 in European Application No. 20206217.0.
Office Action dated Jun. 25, 2021 in Chinese Application No. 202010771782.4.
Office Action dated May 28, 2021 in U.S. Appl. No. 16/997,555.
Notice of Allowance dated Sep. 22, 2021 in U.S. Appl. No. 16/997,555.
Office Action dated Aug. 22, 2022 in U.S. Appl. No. 17/645,679.
Notice of Allowance dated Jan. 3, 2023 in U.S. Appl. No. 17/645,679.

* cited by examiner

CAMERA MODULE COMPRISING A BASE COMPRISING A RIB BETWEEN A LOWER SPRING AND A SHIELD CAN

CROSS-REFERENCE TO RELATED APPLICATIONS

This application is a continuation of U.S. application Ser. No. 17/645,679, filed Dec. 22, 2021; which is a continuation of U.S. application Ser. No. 16/997,555, filed Aug. 19, 2020, now U.S. Pat. No. 11,245,828, issued Feb. 8, 2022; which is a continuation of U.S. application Ser. No. 16/263,850, filed Jan. 31, 2019, now U.S. Pat. No. 10,785,396, issued Sep. 22, 2020; which is a continuation of U.S. application Ser. No. 15/962,741, filed Apr. 25, 2018, now U.S. Pat. No. 10,237,462, issued Mar. 19, 2019; which is a continuation of U.S. application Ser. No. 15/053,340, filed Feb. 25, 2016, now U.S. Pat. No. 9,986,143, issued May 29, 2018; which is a continuation of U.S. application Ser. No. 13/990,674, filed May 30, 2013, now U.S. Pat. No. 9,300,849, issued Mar. 29, 2016; which is the U.S. national stage application of International Patent Application No. PCT/KR2011/008648, filed Nov. 14, 2011; which claims priority to Korean Patent Application Nos. 10-2010-0125731, filed Dec. 9, 2010, and 10-2010-0127053, filed Dec. 13, 2010; all of which are hereby incorporated by reference in their entirety.

BACKGROUND OF THE INVENTION

Field of the Invention

The teachings in accordance with exemplary embodiments of this invention relate generally to a camera module, and more particularly to a camera module configured to have a tolerance to an electrostatic damage.

Background Art

Generally, a compact small-sized camera module is applied to various multimedia fields including notebook type personal computers, camera phones, PDAs (Personal Digital Assistants), smart phones and toys, and to image input equipment including monitoring cameras and information terminals.

A PCB (Printed Circuit Board) of a camera module is manufactured being embedded with various electronic elements, and the electronic elements are generally configured with integrated modules on the PCB. The integrated module used for mobile terminals is exposed to severe radio interference, which in turn results in abnormal function to the electronic elements forming the integrated module.

Under the circumstance where the radio interference causes an abnormal function to the electronic elements forming the integrated module, a metal shield can is generally utilized to inhibit the radio interference. The metal shield serves to alleviate the radio interference ill affecting the electronic elements and to protect the electronic elements against an outside shock.

FIG. 1 is a schematic view for explaining a problem faced by a conventional camera module. Referring to FIG. 1, the conventional camera module includes a PCB (11) mounted with an image sensor (12), a base (20) on the PCB (11), upper and lower spring plates (30, 60), a spacer (40), a cover (70), a lens assembly and a lens actuator (50) and a shield can (80).

The lower spring plate (30) in the conventional camera module that is electrically connected to the PCB (11) forms a layer and may be protruded to outside. The shield can (80) is generally provided with a conductive metal material, such that the lower spring plate (30) and the shield can (80) may be short-circuited, as illustrated in FIG. 1. Furthermore, a short-circuit may be generated between the lower spring plate (30) and a conductive structure even in a camera module free from the shield can (80), if the structure assembled for the camera module is configured with conductive materials.

Technical Problem

The present invention is to provide a camera module directed to solve the aforementioned problems or disadvantages by inhibiting the camera module from being short-circuited with outside conductive materials.

Technical problems to be solved by the present invention are not restricted to the above-mentioned, and any other technical problems not mentioned so far will be clearly appreciated from the following description by skilled in the art.

Solution to the Problem

An object of the invention is to solve at least one or more of the above problems and/or disadvantages in whole or in part and to provide at least the advantages described hereinafter. In order to achieve at least the above objects, in whole or in part, and in accordance with the purposes of the invention, as embodied and broadly described, and in one general aspect of the present invention, there is provided a camera module, the camera module comprising: a PCB; an image sensor mounted on the PCB and formed with an image pickup device; a base mounted on the PCB and including a plated portion formed at a lower center with an opening mounted with an IR (infrared) filter, and accommodated with a connection lead therein, and corner pillar portions each erected at a corner portion of the plated portion; a lower spring plate formed with a conductive material, and connected to the connection lead of the base for coupling with an upper surface of the plated portion; a spacer arranged on an upper surface of the lower spring plate and forming a staircase structure by a rib wrapping a periphery of the lower spring plate to supportively apply a pressure to the lower spring plate; a lens actuator including a bobbin elastically supported by the lower spring plate and accommodated inside a lens assembly, and a yoke wrapping the bobbin and coupled among the corner pillar portions of the base and stacked at an upper surface of the spacer; an upper spring plate coupled to an upper surface of the lens actuator to supportively apply a pressure to the lens actuator; and a cover attached to an upper surface of the upper spring plate and formed thereon with a hole.

Preferably, the camera module is further comprising a shield can of an enclosure formed thereon with a hole and a bottom-opened inner space, accommodating the lens actuator at the inner space, and secured at a bottom end to an upper surface of the PCB.

Preferably, the shield can and the PCB are fixed by an adhesive.

Preferably, the adhesive is a conductive epoxy.

Preferably, the lower spring plate is formed with an upwardly-protruding yoke terminal to supply an electric power to the lens actuator.

In another general aspect of the present invention, there is provide a camera module, the camera module comprising: a PCB; an image sensor mounted on the PCB and formed with an image pickup device; a base mounted on the PCB and including a plated portion formed at a lower center with an opening mounted with an IR (infrared) filter, and corner pillar portions each erected at a corner portion of the plated portion; a lower spring plate formed with a conductive material, and coupled to an upper surface of the plated portion of the base; a lens actuator including a bobbin elastically supported by the lower spring plate and accommodated inside a lens assembly, and a yoke wrapping the bobbin and coupled to an upper surface of the base; an upper spring plate coupled to an upper surface of the lens actuator to supportively apply a pressure to the lens actuator; and a cover arranged on an upper surface of the upper spring plate, coupled to a corner pillar portion of the base and formed thereon with a hole, wherein an upper surface of the plated portion of the base is formed with an accommodation structure inwardly staircased for accommodating the lower spring plate.

Preferably, the camera module is further comprising a shield can of an enclosure formed thereon with a hole and a bottom-opened inner space, accommodating the lens actuator at the inner space, and secured at a bottom end to an upper surface of the PCB.

Preferably, the shield can and the PCB are fixed by an adhesive.

Preferably, the adhesive is a conductive epoxy.

Preferably, the camera module is further comprising a spacer between the lower spring plate and the lens actuator.

Preferably, the lower spring plate is formed with an upwardly-protruding yoke terminal to supply an electric power to the lens actuator.

Advantageous Effects of Invention

A camera module according to the present invention has an advantageous effect in that an occurrence of short-circuit with outside conductive material is inhibited to alleviate damage to the camera module caused by short-circuit through structural change to a spacer, thereby dispensing with formation of additional parts.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1:
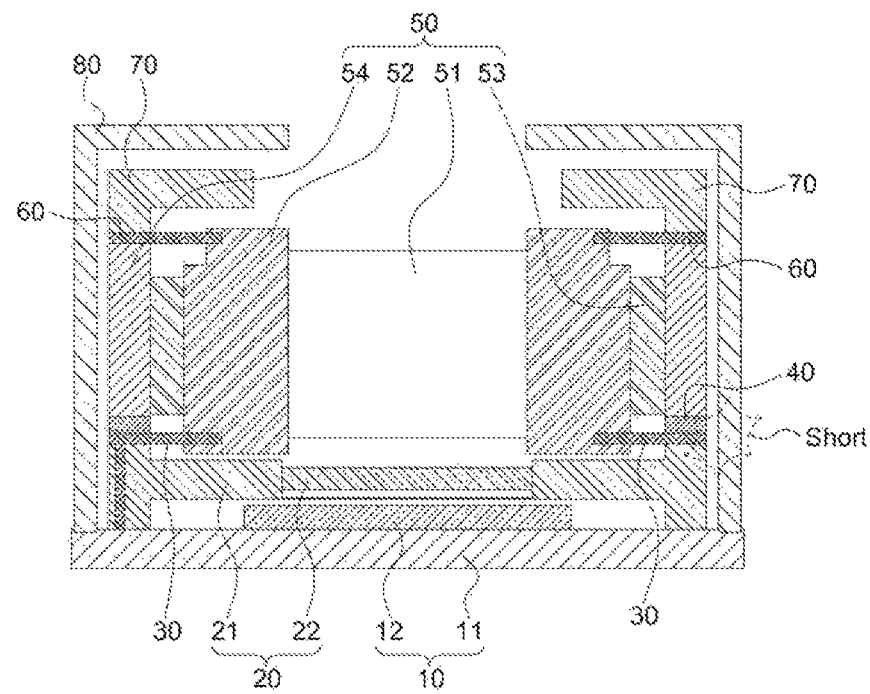
FIG. 1 is a cross-sectional explaining a problem of a conventional camera module.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented. Accordingly, the described aspect is intended to embrace all such alterations, modifications, and variations that fall within the scope and novel idea of the present invention.

It will be understood that the terms "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Words such as "thereafter," "then," "next," etc. are not intended to limit the order of the processes; these words are simply used to guide the reader through the description of the methods.

It will be understood that when an element is referred to as being "connected" or "coupled" to another element, it can be directly connected or coupled to the other elements or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

Now, the camera module according to exemplary embodiments of the present invention will be described in detail with reference to the accompanying drawings.

Figure 2:
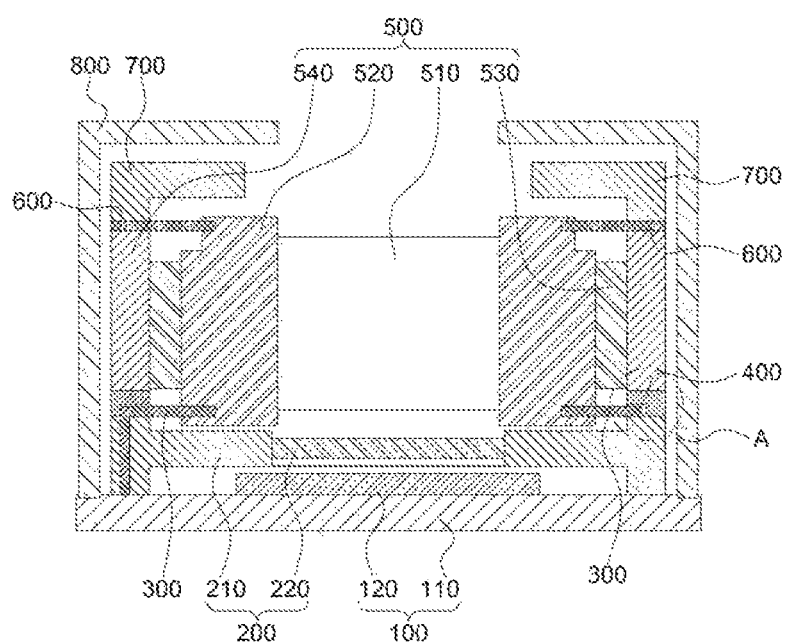
FIG. 2 is a cross-sectional view of a camera module according to a first exemplary embodiment of the present invention.
Figure 3:
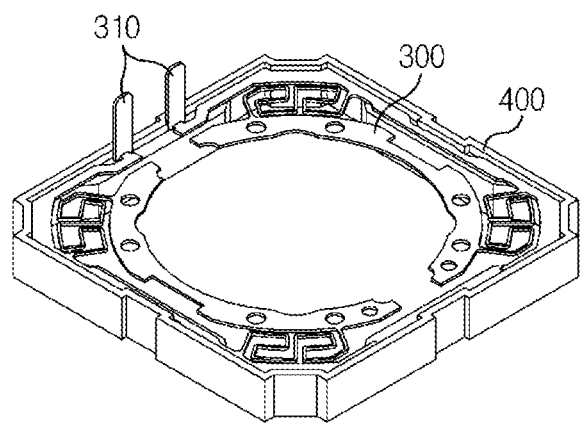
FIG. 3 is a schematic view illustrating a coupled state between a staircase-formed spacer and a lower spring plate.
Figure 4:
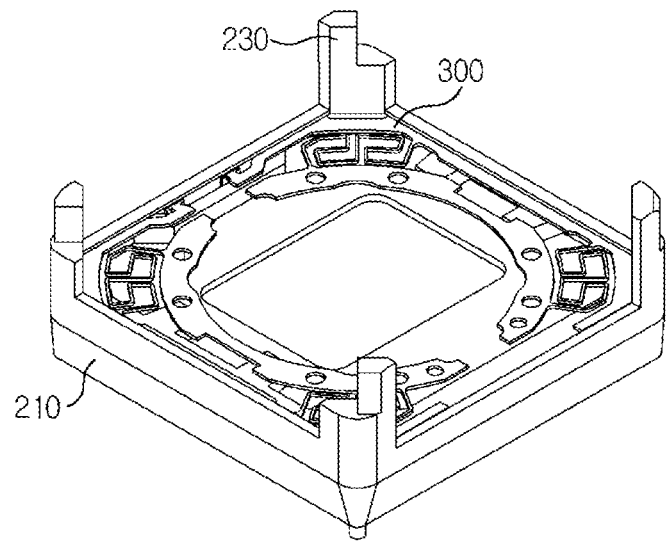
FIG. 4 is a schematic view illustrating a coupled state between a staircase-formed base of a camera module and a lower spring plate according to a second exemplary embodiment of the present invention.
Figure 5:
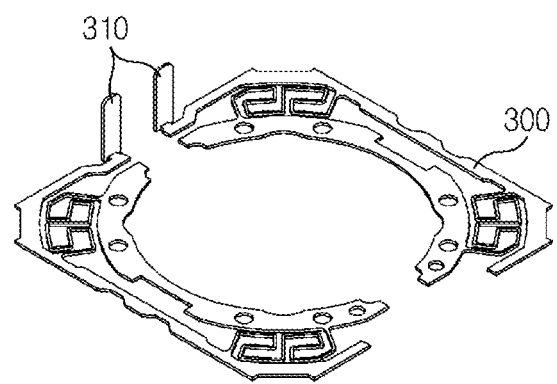
FIG. 5 is a schematic view illustrating the lower spring plate of FIGS. 3 and 4.

FIG. 2 is a cross-sectional view of a camera module according to a first exemplary embodiment of the present invention, FIG. 3 is a schematic view illustrating a coupled state between a staircase-formed spacer and a lower spring plate, FIG. 4 is a schematic view illustrating a coupled state between a staircase-formed base of a camera module and a lower spring plate according to a second exemplary embodiment of the present invention, and FIG. 5 is a schematic view illustrating the lower spring plate of FIGS. 3 and 4.

Referring to FIG. 2, a camera module according to a first exemplary embodiment of the present invention includes a PCB (110), an image sensor (120), a base (200), upper and lower spring plates (300, 600), a spacer (400), a lens assembly and a lens actuator (500), a cover (700), and a shield can (800).

The PCB (110) is mounted with the image sensor (120), and coupled to the base (200) and a lower surface of the can (800). The image sensor (120) is mounted with an image pickup device for converting light incident through a lens formed at a lens assembly (510) positioned at an upper surface of the image sensor (120) to an electrical signal.

The base (200) mounted on the PCB (110) is formed at a lower center thereof with an opening mounted with an IR filter (220) filtering an infrared, and includes a plated portion accommodating a connection lead, and a corner pillar portion (230) perpendicularly formed at a corner portion of the plated portion. The lower spring plate (300) formed with a conductive material is connected to a connection lead of the base (200) and coupled to an upper surface of the plated portion.

The spacer (400) is arranged at an upper surface of the lower spring plate (300), formed with a stair-cased structure by a rib encompassing a periphery of the lower spring plate (300) to supportively apply a pressure to the lower spring plate (300). The conductive lower spring plate (300) is accommodated by the stair-cased structure formed by the rib (see A in FIG. 2) to inhibit the conductive material from being exposed to an external surface of the spacer (400), whereby the lower spring plate (300) and an outside conductive material from being short-circuited. The difference created by the structure can be more distinctively shown in comparison with the prior art of FIG. 1. In case of structure of FIG. 1, a periphery of the lower spring plate (30) is structurally exposed to an external surface of the spacer (40), the structure of which can generate an occurrence of short-circuit with an outside conductive material, whereas the rib structure of spacer (400) according to the present invention has an effect of completely removing the occurrence of short-circuit.

Now, referring to FIGS. 2 and 3, the lower spring plate (300) is formed with an upwardly protruding yoke terminal (310). The yoke terminal (310) is inserted into a connection hole of a yoke (540) at the lens actuator (500), and the lower spring plate (300) is electrically connected to the PCB (110) through a connection lead inside the base (210) to allow the lens actuator (500) to be provided with an electric power.

The lens actuator (500) includes a lens assembly (510), a bobbin (520) accommodating the lens assembly (510), a coil wound on a periphery of the bobbin (520) and the yoke (540), which are elements for vertically driving the lens assembly (510). The upper spring plate (600) is coupled to an upper surface of the lens actuator (500) to supportively apply a pressure to the lens actuator (500). The cover (700) is attached to an upper surface of the upper spring plate (600) and is formed at an upper center thereof with a center hole.

The shield can (800), an enclosure formed at a upper center thereof with a hole and a bottom-opened inner space, accommodates the lens actuator (500) at the inner space, and fixed at a bottom end to an upper surface of the PCB (110) by an adhesive. The adhesive may include a conductive epoxy, but is not limited thereto.

MODE FOR INVENTION

FIG. 4 is a schematic view illustrating a coupled state between a staircase-formed base of a camera module and a lower spring plate according to a second exemplary embodiment of the present invention, and FIG. 5 is a schematic view illustrating the lower spring plate formed with an upwardly protruding yoke terminal according to another exemplary embodiment of the present invention.

An upper surface of a plated portion of a base (210) according to another exemplary embodiment of the present invention is formed with an accommodation structure inwardly formed with staircases to accommodate the lower spring plate (300) (see 'A' of FIG. 2). In a case the lower spring plate (300) is accommodated in the accommodation structure, the conductive lower spring plate (300) is accommodated by the staircases at an upper surface of the plated portion of the base (210) to structurally inhibit from exposing to an external surface of the base (210), whereby the lower spring plate (300) is inhibited from being short-circuited with an external conductive material.

The difference created by the structure can be more distinctively shown in comparison with the prior art of FIG. 1. In case of structure of FIG. 2, a periphery of the lower spring plate (30) is structurally exposed to an external surface of the base (21), the structure of which can generate an occurrence of short-circuit with an outside conductive material, whereas the inwardly staircased accommodation structure according to the present invention has an effect of completely removing the occurrence of short-circuit.

Now, referring to FIG. 5, the lower spring plate (300) is formed with an upwardly protruding yoke terminal (310). The yoke terminal (310) is inserted into a connection hole of a yoke (540) at the lens actuator (500), and the lower spring plate (300) is electrically connected to a circuit of the PCB (110) to allow the lens actuator (500) to be provided with an electric power.

That is, the second exemplary embodiment of the present invention is comprising a stair-cased structure formed at the base (210), and other structures make no big difference from those of the first exemplary embodiment, such that an overlapped explanation is omitted.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention.

Thus, the invention is not intended to limit the examples described herein, but is to be accorded the widest scope consistent with the principles and novel features disclosed herein.

INDUSTRIAL APPLICABILITY

The camera module according to the present invention has an industrial applicability in that the novel idea of the present invention can be applied to a small-sized camera module using a voice coil motor as an automatic focus adjusting unit.

What is claimed is:

1. A camera module, comprising:
   a base;
   a shield can disposed on the base and comprising an upper plate and a lateral plate extending from the upper plate;
   a bobbin disposed in the shield can;
   a lower spring comprising an inner portion coupled to the bobbin, an outer portion disposed on an upper surface of the base, a connection portion connecting the inner portion and the outer portion, and a terminal portion extending from the outer portion of the lower spring; and
   a filter disposed on the base,
   wherein the base comprises a rib protruding from the upper surface of the base and disposed between the lower spring and the lateral plate of the shield can in a direction perpendicular to an optical axis,
   wherein the base comprises a hole, and
   wherein the terminal portion passes through the hole of the base.

2. The camera module of claim 1, wherein the terminal portion comprises a bent portion bent from the outer portion of the lower spring.

3. The camera module of claim 1, wherein the terminal portion is spaced apart from an inner surface of the lateral plate of the shield can.

4. The camera module of claim 1, wherein the filter comprises an IR filter.

5. The camera module of claim 1, comprising a coil and a magnet configured to move the bobbin in a direction of the optical axis and disposed in the shield can.

6. The camera module of claim 1, wherein the coil is electrically connected with the lower spring.

7. The camera module of claim 1, wherein the base comprises a first pillar portion protruding from a first corner area of the upper surface of the base and a second pillar portion protruding from a second corner area of the upper surface of the base, and
   wherein the rib comprises a first rib connecting the first pillar portion and the second pillar portion.

8. The camera module of claim 7, wherein the base comprises a third pillar portion protruding from a third corner area of the upper surface of the base and a fourth pillar portion protruding from a fourth corner area of the upper surface of the base,
   wherein the first corner area and the third corner area are opposite to each other, and
   wherein the second corner area and the fourth corner area are opposite to each other.

9. The camera module of claim 8, wherein the rib comprises a second rib connecting the second pillar portion and third pillar portion and a third rib connecting the third pillar portion and the fourth pillar portion.

10. The camera module of claim 7, wherein an outer lateral surface of the first rib and a part of an outer lateral surface of the first pillar portion are disposed on one plane surface.

11. The camera module of claim 7, wherein the first pillar portion upwardly protrudes from the first rib.

12. The camera module of claim 1, wherein at least a portion of the outer portion of the lower spring is disposed in the rib of the base, and
    wherein an upper end of the rib is disposed higher than an upper surface of the outer portion of the lower spring.

13. The camera module of claim 1, wherein the outer portion of the lower spring is contacted with an inner lateral surface of the rib of the base.

14. The camera module of claim 1, wherein a lower end of the shield can is disposed lower than a lower surface of the lower spring.

15. The camera module of claim 1, comprising:
    a PCB (Printed Circuit Board);
    an image sensor disposed on the PCB; and
    a lens coupled to the bobbin,
    wherein the base is disposed on the PCB, and
    wherein the shield can is connected to the PCB.

16. A smart phone comprising the camera module of claim 1.

17. A camera module, comprising:
    a base;
    a shield can disposed on the base and comprising an upper plate and a lateral plate extending from the upper plate;
    a bobbin disposed in the shield can;
    a lower spring comprising an inner portion coupled to the bobbin, an outer portion disposed on an upper surface of the base, a connection portion connecting the inner portion and the outer portion, and a terminal portion extending from the outer portion of the lower spring; and
    a filter disposed on the base,
    wherein the base comprises a rib protruding from the upper surface of the base and disposed between the lower spring and the lateral plate of the shield can in a direction perpendicular to an optical axis,
    wherein the base comprises a first pillar portion protruding from a first corner area of the upper surface of the base and a second pillar portion protruding from a second corner area of the upper surface of the base, and
    wherein the rib comprises a first rib connecting the first pillar portion and the second pillar portion.

18. The camera module of claim 17, wherein the base comprises a third pillar portion protruding from a third corner area of the upper surface of the base and a fourth pillar portion protruding from a fourth corner area of the upper surface of the base,
    wherein the first corner area and the third corner area are opposite to each other, and
    wherein the second corner area and the fourth corner area are opposite to each other.

19. The camera module of claim 18, wherein the rib comprises a second rib connecting the second pillar portion and third pillar portion and a third rib connecting the third pillar portion and the fourth pillar portion.

20. The camera module of claim 17, wherein the base comprises a hole,
    wherein the terminal portion passes through the hole of the base, and wherein the hole of the base is spaced apart from an outer periphery of the base so that the terminal portion is disposed further inward than the outer periphery of the base.

* * * * *